United States Patent
Ishikawa et al.

[11] Patent Number: 6,164,022
[45] Date of Patent: Dec. 26, 2000

[54] THREE DIMENSIONAL GUIDE

[75] Inventors: Hirokazu Ishikawa; Masashi Konomoto; Yoshikazu Suga, all of Tokyo, Japan

[73] Assignee: THK Co., Ltd., Tokyo, Japan

[21] Appl. No.: 09/297,334

[22] PCT Filed: Sep. 3, 1998

[86] PCT No.: PCT/JP98/03949

§ 371 Date: Jul. 1, 1999

§ 102(e) Date: Jul. 1, 1999

[87] PCT Pub. No.: WO99/11942

PCT Pub. Date: Mar. 11, 1999

[30] Foreign Application Priority Data

Sep. 4, 1997 [JP] Japan .................................. 9-256016

[51] Int. Cl.[7] .................. E04B 1/98; E04H 9/02
[52] U.S. Cl. .................. 52/167.5; 52/167.1; 52/167.4
[58] Field of Search ............... 52/167.1, 167.4, 52/167.5, 167.6, 167.7

[56] References Cited

U.S. PATENT DOCUMENTS

| 2,014,643 | 9/1935 | Bakker | 52/167.1 X |
| 4,883,250 | 11/1989 | Yano et al. | 248/638 |
| 5,261,200 | 11/1993 | Sasaki et al. | 52/167.5 |
| 5,442,883 | 8/1995 | Nishimura et al. | 52/167.2 |
| 5,934,029 | 8/1999 | Kawai et al. | 52/167.5 |
| 5,970,666 | 10/1999 | Kurabayashi et al. | 52/167.6 |

FOREIGN PATENT DOCUMENTS

| 53-43158 | 4/1978 | Japan . |
| 8-226442 | 9/1996 | Japan . |
| 9-72333 | 3/1997 | Japan . |

*Primary Examiner*—Beth A. Stephan
*Assistant Examiner*—Brian E. Glessner
*Attorney, Agent, or Firm*—Wenderoth, Lind & Ponack, L.L.P.

[57] ABSTRACT

A three-dimensional guiding apparatus is installed between the ground and a structure for preventing vibrations of the ground from being transmitted to the structure as much as possible. The three-dimensional guiding apparatus has a first curved guiding apparatus (21) mounted on a base (23), a second curved guiding apparatus (22) having a plane of movement which crosses the plane of movement of the first curved guiding apparatus (21), and an intermediate member (24) interconnecting the first curved guiding apparatus (21) and the second curved guiding apparatus (22). Each of the first and second curved guiding apparatus (21, 22) comprises a track rail (1) having a plurality of rolling element rolling grooves, a bearing block (10) having a plurality of rolling element rolling grooves and non-loading rolling element rolling passages, and a number of balls (9) for bearing loads between the rolling element rolling grooves in the track rail (1) and the rolling element rolling grooves in the bearing block (10). The intermediate member (24) has open cylindrical recesses (241, 242) defined respectively in two surfaces thereof, with the bearing blocks (10) being rotatably fitted in the open cylindrical recesses.

8 Claims, 13 Drawing Sheets

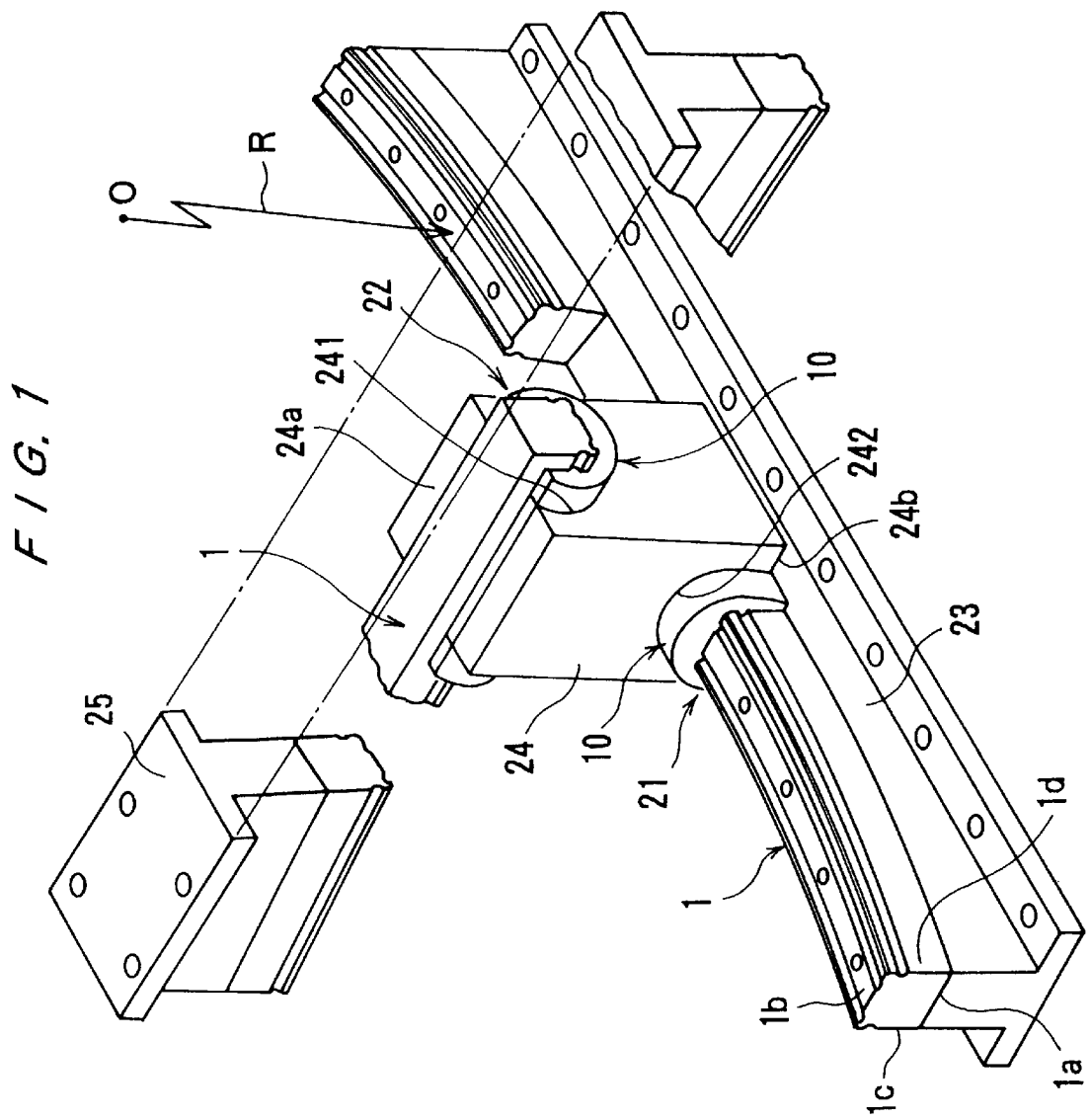

F I G. 1 3
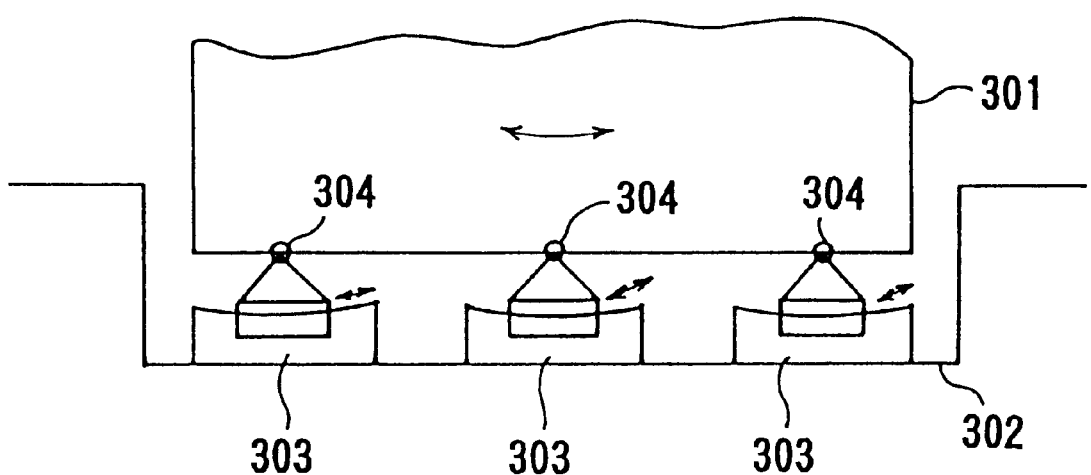

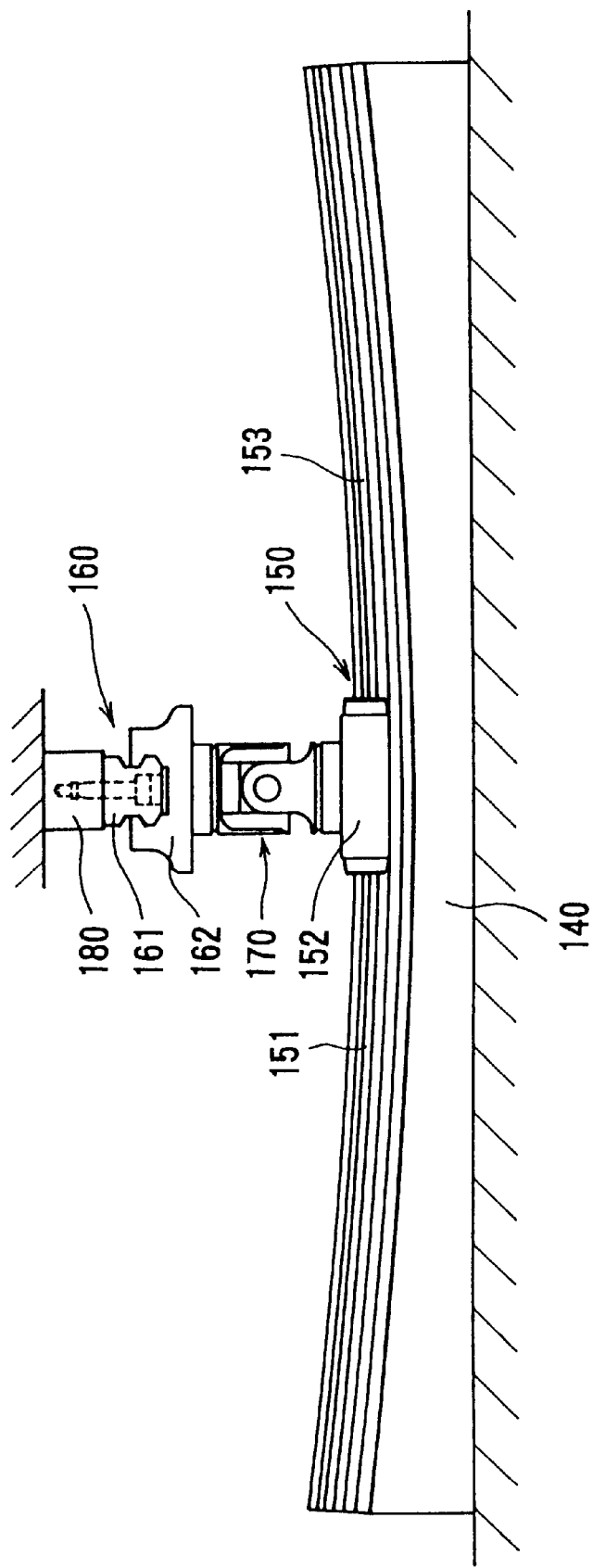

THREE DIMENSIONAL GUIDE

TECHNICAL FIELD

The present invention relates to a vibration isolating three-dimensional guiding apparatus, and more particularly to a vibration isolating three-dimensional guiding apparatus for disposed between the ground and a structure for preventing vibrations of the ground from being transmitted to the structure (building) as much as possible.

BACKGROUND ART

Heretofore, some structures have employed a vibration isolating construction specially designed to minimize the effect of seismic vibrations in view of the properties of the seismic vibrations. One such vibration-isolated structure incorporates a vibration isolator disposed between the ground and the structure for preventing vibrations of the ground due to earthquakes from being transmitted to the structure (building) as much as possible.

According to such a vibration isolator, as shown in FIGS. 15A and 15B of the accompanying drawings (FIG. 15A is an elevational view and FIG. 15B is a plan view), a building 301 is not fixed to a foundation 302, but a plurality of guiding apparatuses 303 for allowing the building 301 to move on the foundation 302 are disposed between the foundation 302 and the building 301. When seismic forces higher than a certain level are applied, the building 301 slides on the guiding apparatuses 303 to prevent the seismic forces from acting on the building 301.

The applicant of the present invention has previously proposed three-dimensional guiding apparatuses for use as the above guiding apparatus in Japanese patent application No. 9-37072. The proposed three-dimensional guiding apparatuses are roughly grouped into two types. FIG. 12 of the accompanying drawings shows in perspective one of the types of the proposed three-dimensional guiding apparatus. As shown in FIG. 12, the three-dimensional guiding apparatus has a base 140, a first curved guiding apparatus 150 mounted on the base 140 and having an arcuate track, a second curved guiding apparatus 160 disposed above the first curved guiding apparatus 150 and having a plane of movement along an arcuate track which crosses the plane of movement of the first curved guiding apparatus 150, and an intermediate member 170 positioned between the first curved guiding apparatus 150 and the second curved guiding apparatus 160 and interconnecting the first curved guiding apparatus 150 and the second curved guiding apparatus 160.

The first and second curved guiding apparatuses 150, 160 comprise track rails 151, 161 vertically curved at a predetermined curvature and having ball rolling grooves 153, 163 defined along an arcuate shape of predetermined curvature in mutually confronting surfaces, bearing blocks 152, 162 having an U-shaped cross section astride the track rails 151, 161 and having ball rolling grooves defined in alignment with the ball rolling grooves in the track rails 151, 161 along an arcuate shape of predetermined curvature, and a plurality of balls (not shown) disposed for bearing loads between the ball rolling grooves in the track rails 151, 161 and the ball rolling grooves in the bearing blocks 152, 162. The intermediate member 170 which interconnects the first curved guiding apparatus 150 and the second curved guiding apparatus 160 is in the form of a rigid block.

FIG. 13 of the accompanying drawings is a view showing the manner in which the three-dimensional guiding apparatus shown in FIG. 12 is used.

As shown in FIG. 13, three-dimensional guiding apparatuses 303 have respective spherical guide tracks whose centers of curvature are established separately, rather than as a common center, on a building 301. Between the building 301 and the three-dimensional guiding apparatuses 303, there are provided tilt absorbing mechanisms 304 for allowing tilts generated between the building 301 and the three-dimensional guiding apparatuses 303 when vibrations occur. Each of the tilt absorbing mechanisms 304 may comprises a universal joint, a spherical bearing, or an elastic member of rubber or the like.

FIG. 14 of the accompanying drawings is a front elevational view showing the other type of the three-dimensional guiding apparatus.

As shown in FIG. 14, the three-dimensional guiding apparatus comprises a base 140, a first curved guiding apparatus 150 mounted on the base 140 and having an arcuate track, a second curved guiding apparatus 160 disposed above the first curved guiding apparatus 150 and having a plane of movement along an arcuate track crossing the plane of movement of the first curved guiding apparatus 150, and an intermediate member 170 positioned between the first curved guiding apparatus 150 and the second curved guiding apparatus 160 and interconnecting the first curved guiding apparatus 150 and the second curved guiding apparatus 160. A moving base 180 on which a building is supported is fixedly mounted on the second curved guiding apparatus 160. In this example, the intermediate member 170 comprises a universal joint for absorbing tilts between the first curved guiding apparatus 150 and the second curved guiding apparatus 160. The intermediate member may comprise a spherical bearing, an elastic member such as a spring or a rubber member, rather than the universal joint.

The first and second curved guiding apparatuses 150, 160 comprise track rails 151, 161 vertically curved at a predetermined curvature and having ball rolling grooves 153, 163 defined along an arcuate shape of predetermined curvature in mutually confronting surfaces, bearing blocks 152, 162 having an U-shaped cross section astride the track rails 151, 161 and having ball rolling grooves defined in alignment with the ball rolling grooves in the track rails 151, 161 along an arcuate shape of predetermined curvature, and a plurality of balls (not shown) disposed for bearing loads between the ball rolling grooves in the track rails 151, 161 and the ball rolling grooves in the bearing blocks 152, 162.

In the absence of seismic vibrations, the vibration isolating construction with the above three-dimensional guiding apparatus allows the building to be stably positioned in a steady position on the three-dimensional guiding apparatus. Even when an earthquake occurs and causes the ground to vibrate, the ground and the building are isolated against the transmission of vibrations by the three-dimensional guiding apparatus, so that large vibrations will not be transmitted to the building. After seismic vibrations are settled, any vibrations of the building with respect to the ground are attenuated, and the building is stabilized in the steady position on the three-dimensional guiding apparatus.

In order for the three-dimensional guiding apparatus proposed in Japanese patent application No. 9-37072 to keep the building in a horizontal state when the building suffers vibrations caused by earthquakes or the like, it is necessary to provide a tilt absorbing mechanism between the first curved guiding apparatus and the second curved guiding apparatus. The tilt absorbing mechanism comprises a universal joint, a spherical bearing, or an elastic member such as a spring or a rubber member.

If the tilt absorbing mechanism comprises a universal joint or a spherical bearing, then since the overall weight of the building has to be borne by a sliding portion such as a crisscross shank (universal joint) or a spherical seat having a small area, stresses developed in the sliding portion become unduly larger than those developed in other members, and tend to be broken or worn in a short period of time.

If the tilt absorbing mechanism comprises an elastic member such as a rubber member, then it is capable of bearing only loads within an elastically deformable range, and incapable of bearing higher loads. Another problem is that the elastic member is poor in durability as it is liable to suffer flatting due to aging. That is, the three-dimensional guiding apparatus proposed in Japanese patent application No. 9-37072 is unable to bear heavy loads because of the tilt absorbing mechanism.

It is an object of the present invention to provide a three-dimensional guiding apparatus which has a tilt absorbing function, is cable of bearing heavy loads, and has excellent durability.

DISCLOSURE OF INVENTION

To achieve the above object, there is provided in accordance with the present invention a three-dimensional guiding apparatus having a base, a first curved guiding apparatus mounted on the base and having an arcuate track, a second curved guiding apparatus disposed above the first curved guiding apparatus and having a plane of movement along an arcuate track which crosses the plane of movement of the first curved guiding apparatus, and an intermediate member positioned between the first curved guiding apparatus and the second curved guiding apparatus and interconnecting the first curved guiding apparatus and the second curved guiding apparatus, each of the first and second curved guiding apparatuses comprising: a track rail vertically curved at a predetermined curvature and having a plurality of rolling element rolling grooves defined in outer surfaces thereof; a bearing block comprising a substantially cylindrical rigid body and having in inner surfaces thereof a plurality of rolling element rolling grooves in alignment with the rolling element rolling grooves in the track rail and non-loading rolling element rolling passages adjacent to the rolling element rolling grooves; a pair of lids mounted respectively on front and rear ends of the bearing block and having respective rolling element direction changing passages defined in respective inner surfaces thereof, the rolling element direction changing passages connecting ends of the rolling element rolling grooves and the non-loading rolling element passages and providing an endless rolling element circulation path; and a plurality of rolling elements disposed to circulate in the endless rolling element circulation path for bearing loads between the rolling element rolling grooves in the track rail and the rolling element rolling grooves in the bearing block; the intermediate member comprising a rigid body in the form of a block and having open cylindrical recesses defined respectively in two surfaces thereof, the bearing blocks being rotatably fitted in the open cylindrical recesses.

The intermediate member comprises a rigid body in the form of a block, and the bearing blocks, each comprising a rigid body, of the first and second curved guiding apparatuses are rotatably fitted respectively in the cylindrical recesses defined respectively in the two surfaces of the intermediate member, thus providing a tilt absorbing capability between the first and second curved guiding apparatuses. Since the tilt absorbing capability is performed and the building is supported by sliding surfaces which have a large contact area and which are provided by the contacting rigid bodies, the three-dimensional guiding apparatus can bear heavy loads and have excellent durability.

BRIEF DESCRIPTION OF DRAWINGS

FIG. 1 is a perspective view of a three-dimensional guiding apparatus according to a first embodiment of the present invention;

FIG. 13 is a view showing the manner in which the three-dimensional guiding apparatus shown in FIG. 12 is used;

FIG. 14 is a perspective view of another example of the three-dimensional guiding apparatus previously proposed by the applicant of the present invention.

BEST MODE FOR CARRYING OUT THE INVENTION

Embodiments of three-dimensional guiding apparatus according to the present invention will be described below with reference to FIGS. 1 through 13.

[1st Embodiment]

Figure 2A:
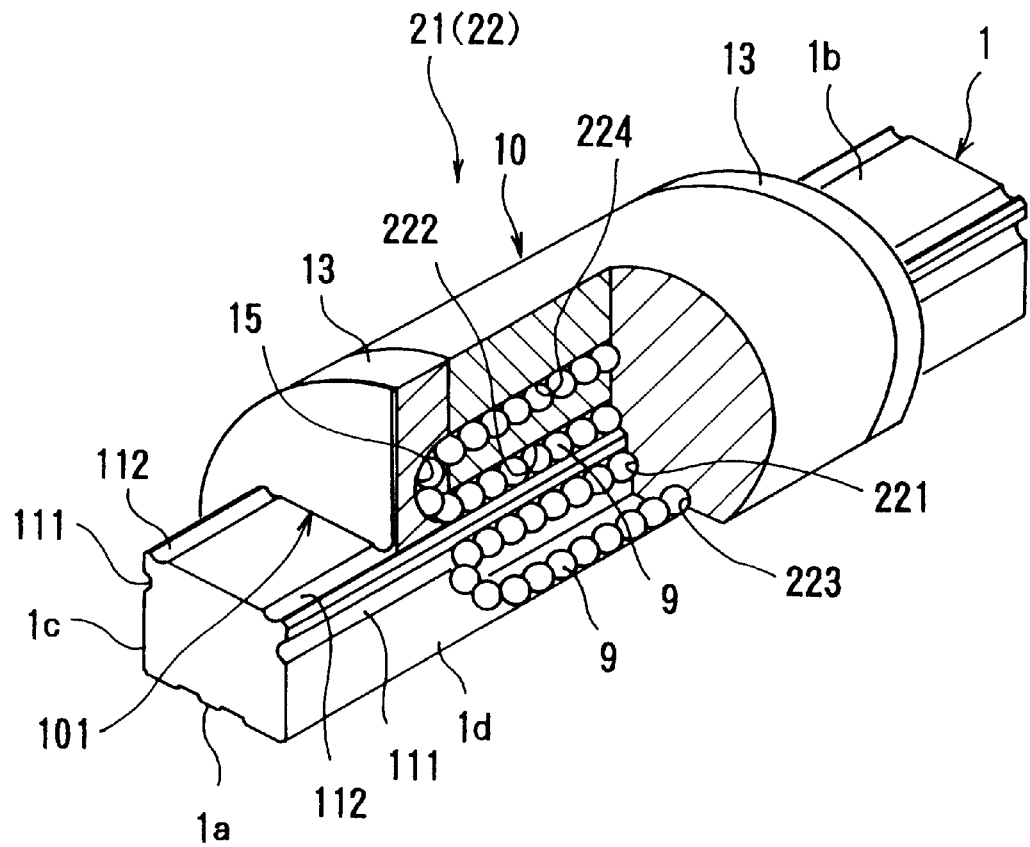
FIGS. 2A and 2B are perspective views of first and second curved guiding apparatus in the embodiment shown in FIG. 1.
Figure 2B:
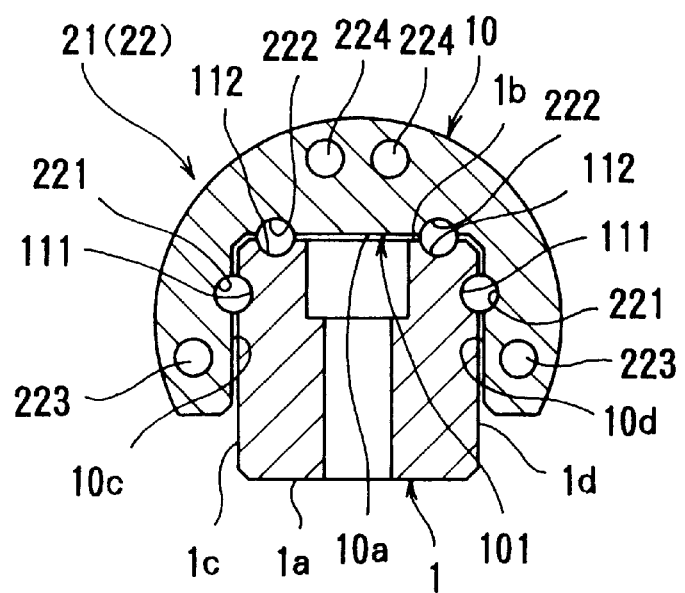
Figure 3:
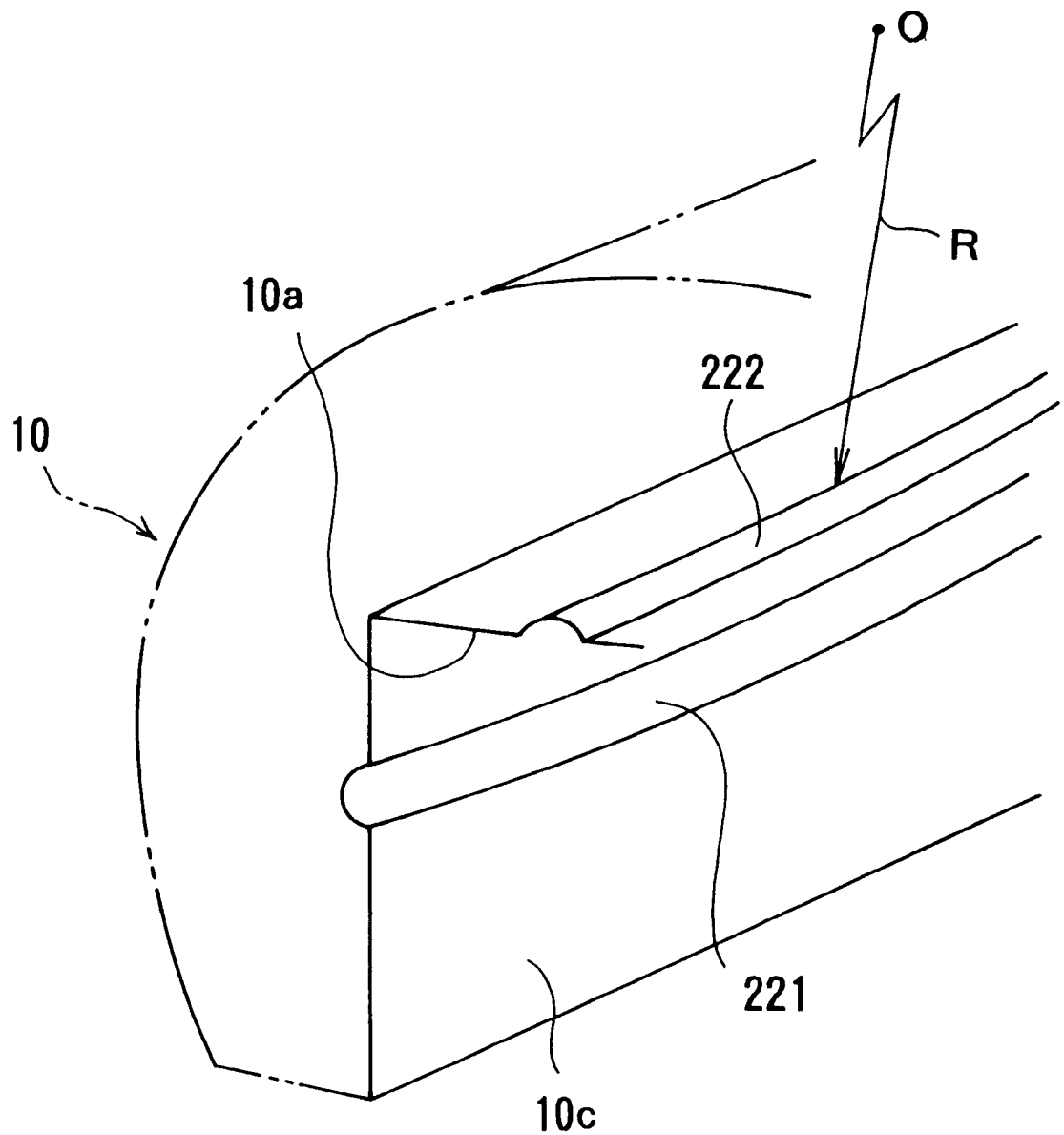
FIG. 3 is a perspective view showing ball rolling grooves defined in a bearing block in the embodiment shown in FIG. 1.
Figure 4:
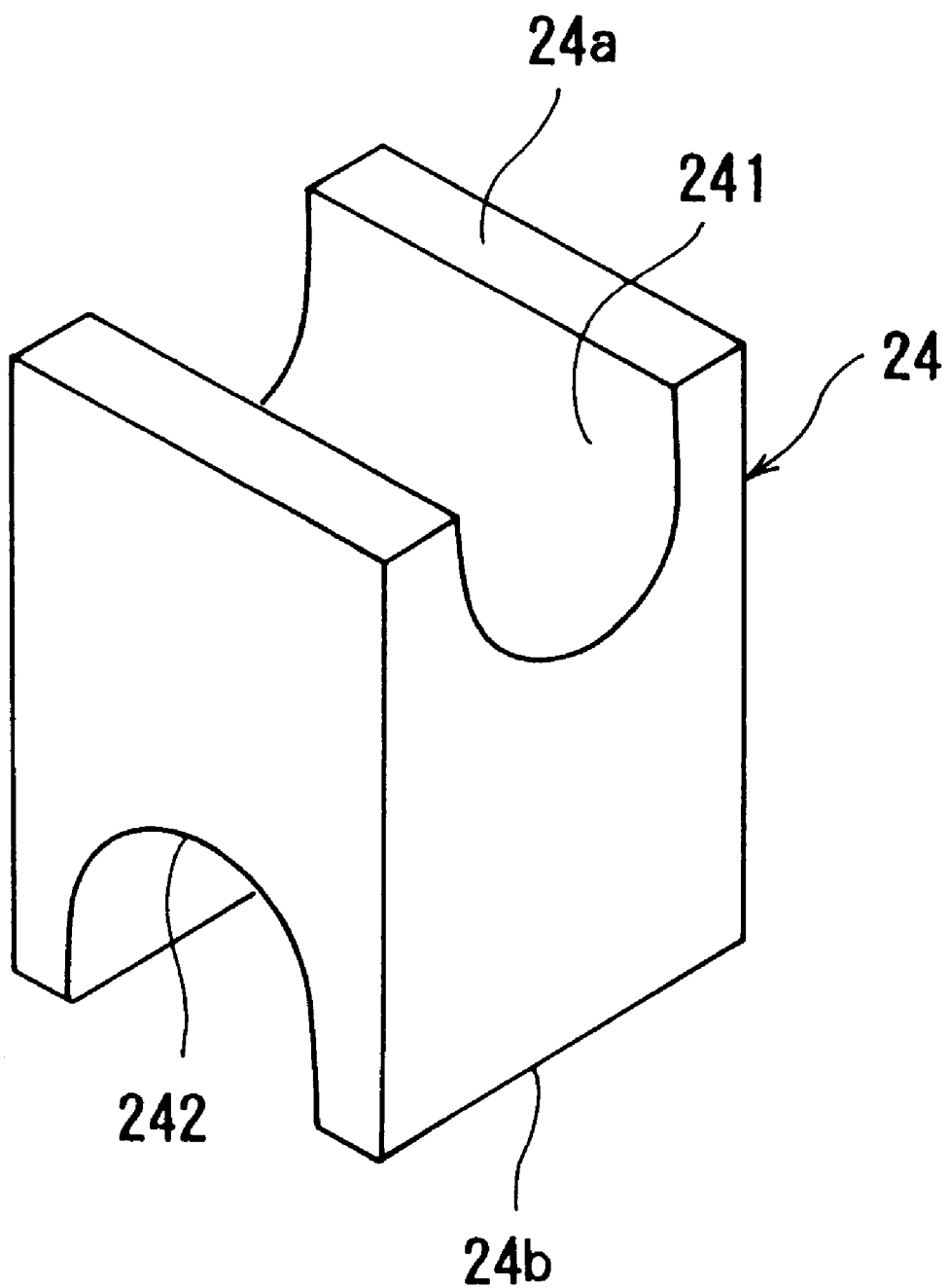
FIG. 4 is a perspective view showing an intermediate member in the form of a block in the embodiment shown in FIG. 1.

FIGS. 1 through 4 show a three-dimensional guiding apparatus according to a first embodiment of the present invention. FIG. 1 is a perspective view of the three-dimensional guiding apparatus, FIG. 2 is a perspective view of first and second curved guiding apparatus, FIG. 3 is a perspective view showing a bearing block, and FIG. 4 is a perspective view showing an intermediate member.

As shown in FIG. 1, the three-dimensional guiding apparatus according to the first embodiment comprises a base 23 fixed to a foundation, a first curved guiding apparatus 21 mounted on the base 23 and having an arcuate track, a second curved guiding apparatus 22 disposed above the first curved guiding apparatus 21 and having a plane of movement along an arcuate track which crosses the plane of movement of the first curved guiding apparatus 21, and an intermediate member 24 positioned between the first curved guiding apparatus 21 and the second curved guiding apparatus 22 and interconnecting the first curved guiding apparatus 21 and the second curved guiding apparatus 22. A moving base 25 on which a building is supported is fixedly mounted on the second curved guiding apparatus 22.

The first curved guiding apparatus 21 and the second curved guiding apparatus 22 are structurally identical to each other. As shown in FIGS. 2A and 2B (FIG. 2A is a fragmentary perspective view, partly broken away, and FIG. 2B is a transverse cross-sectional view), each of the first curved guiding apparatus 21 and the second curved guiding apparatus 22 comprises a curved track rail 1 vertically curved at a predetermined curvature, and a bearing block 10 slidably supported on the curved track rail 1 by a number of balls 9 and having an endless ball circulation passage. As shown in FIG. 1, the curved track rail 1 has a substantially rectangular cross-sectional shape, and is arcuately curved with a predetermined vertical curvature. The curved track rail 1 has a center O of curvature positioned vertically upwardly and a radius R of curvature. The curved track rail 1 has a convex attachment surface (lower surface) 1a and a concave surface (upper surface) 1b opposite to the attachment surface 1a.

The attachment surface (lower surface) of the track rail 1 will be referred to as a first surface 1a, the surface (upper surface) opposite to the attachment surface as a second surface 1b, and both side surfaces extending from both surfaces of the first surface 1a as third and fourth surfaces 1c, 1d.

As shown in FIGS. 2A and 2B, the third and fourth surfaces 1c, 1d of the curved track rail 1 have ball rolling grooves 111 defined thereby along an arcuate shape of predetermined curvature, and the second surface 1b has parallel ball rolling grooves 112 along the track rail 1.

The bearing block 10 comprises a substantially cylindrical rigid body and has a downwardly open cavity 101 defined therein. The bearing block 10 also has ball rolling grooves 221 defined in both inner side surfaces 10c, 10d thereof in alignment with the ball rolling grooves 111 in the curved track rail 1 along an arcuate shape of predetermined curvature (with the radius R of curvature). The bearing block 10 also has parallel ball rolling grooves 222 defined in an inner lower surface 10a thereof in alignment with the ball rolling grooves 112.

The bearing block 10 also has non-loading ball passages 223, 224 defined therein adjacent to the ball rolling grooves 221, 222 in association with the ball rolling grooves 221, 222. As shown in FIGS. 2A and 2B, lids 13, 13 are mounted respectively on front and rear ends of the bearing block 10, and have respective ball direction changing passages 15 defined in respective inner surfaces thereof and connecting ends of the ball rolling grooves 221, 222 and the non-loading ball passages 223, 224, thus providing an endless ball circulation path. The balls 9 are disposed to circulate in the endless ball circulation path for bearing loads between the ball rolling grooves 111, 112 in the track rail 1 and the ball rolling grooves 221, 222 in the bearing block 10.

Contact angle lines interconnecting points of contact between the balls 9 and the confronting lower ball rolling grooves 111, 221 are inclined to the horizontal direction by 45 degrees. Contact angle lines interconnecting points of contact between the balls 9 and the confronting upper ball rolling grooves 112, 222 extend in the vertical direction (the direction in which loads are applied).

FIG. 3 is a perspective view showing the upper and lower ball rolling grooves 221, 222 which are defined in the inner cavity in the bearing block 10. The upper and lower ball rolling grooves 221, 222 are of an arcuate shape at a predetermined vertical curvature (radius R of curvature), and are downwardly convex.

FIG. 4 is a perspective view of the intermediate member 24 in the form of a block. As shown in FIG. 4, the intermediate member 24 comprises a rigid body substantially in the shape of a rectangular parallelepiped, and has open cylindrical recesses 241, 242 defined respectively in upper and lower surfaces 24a, 24b. The bearing blocks 10 are rotatably fitted respectively in the cylindrical recesses 241, 242. The bearing blocks 10 fitted respectively in the cylindrical recesses 241, 242 are fixed by a fixing means such that the bearing blocks 10 are rotatable about longitudinal axes thereof with respect to the intermediate member 24, but immovable along the longitudinal axes thereof.

According to the first embodiment, the intermediate member 24 comprises a rigid body in the form of a block, and the bearing blocks 10, 10, each comprising a rigid body, of the first and second curved guiding apparatus 21, 22 are rotatably fitted respectively in the cylindrical recesses 241, 242 defined respectively in the upper and lower surfaces of the intermediate member 24, thus providing a tilt absorbing capability between the first and second curved guiding apparatus 21, 22. Since the tilt absorbing capability is performed and the building is supported by sliding surfaces which have a large contact area and which are provided by the contacting rigid bodies (the inner circumferential surfaces of the recesses 241, 242 of the intermediate member 24 and the outer circumferential surfaces of the bearing blocks 10), the three-dimensional guiding apparatus can bear heavy loads and have excellent durability.

In the first embodiment, when the foundation of the building on the moving base 25 swings due to an earthquake caused by crustal movements, the building moves along the upper and lower curved track rails 1 owing to the acceleration. This is because the acceleration is divided into components along X and Y directions of the track rails 1 though the seismic swinging motion is in any arbitrary direction. Even when the building swings, the tilt absorbing capability is performed by the angular movement between the intermediate member 24 and the bearing blocks 10 to thus keep the building horizontal. Since the upper and lower curved track rails 1 are kept in mutually perpendicular directions at all times, a plurality of three-dimensional guiding apparatuses can easily be aligned directionally when the building is installed. Specifically, once the curved track rails 1 of the foundation side are aligned directionally, the curved track rails 1 of the building side are necessarily determined and do not need to be aligned directionally.

In the first embodiment, furthermore, a plurality of three-dimensional guiding apparatuses are interposed between the ground and the building. Inasmuch as the upper and lower bearing blocks 10 are rotatable with respect to the intermediate member 24, any misalignments (centering errors) and level errors can be easily absorbed. The intermediate member 24 in the form of a simple low-profile block allows the three-dimensional guiding apparatus to be smaller in vertical height than would be if a universal joint were used as the intermediate member.

[2nd Embodiment]

Figure 5:
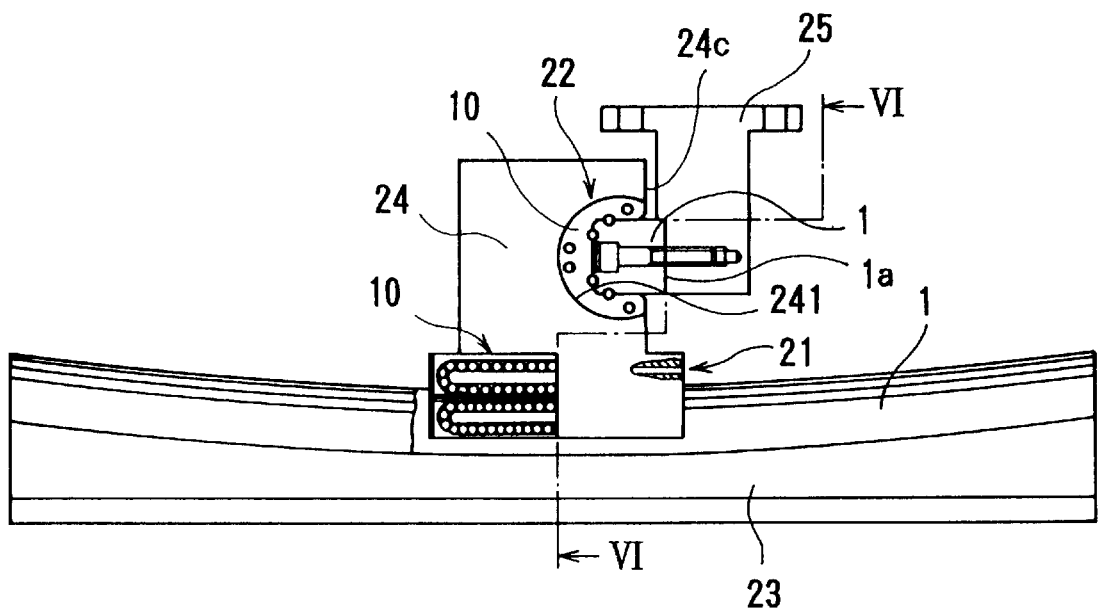
FIG. 5 is a side elevational view of a three-dimensional guiding apparatus according to a second embodiment of the present invention.
Figure 6:
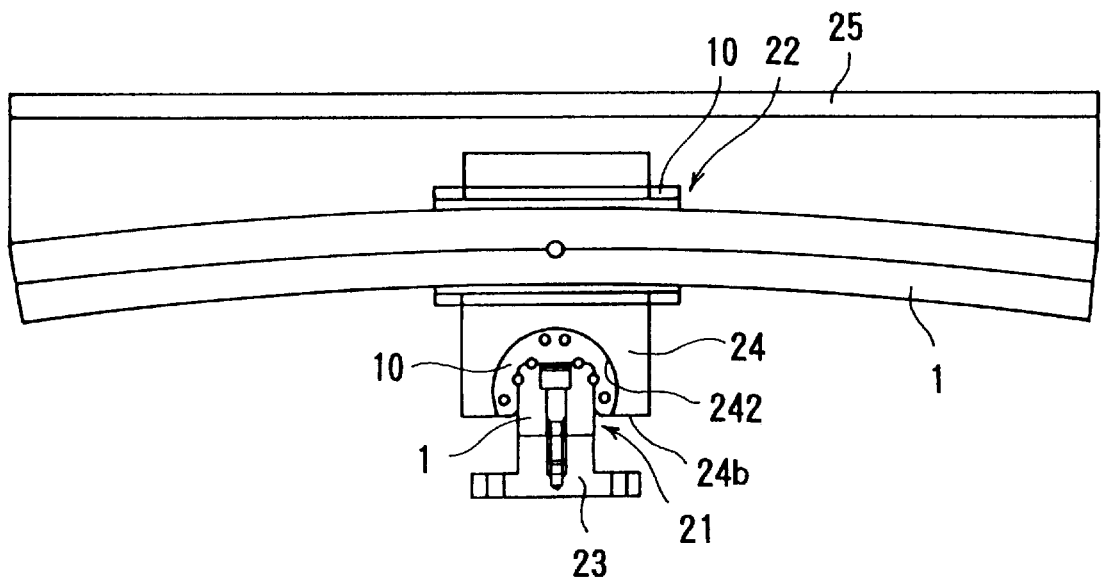
FIG. 6 is a cross-sectional view taken along line VI—VI of FIG. 5.
Figure 7:
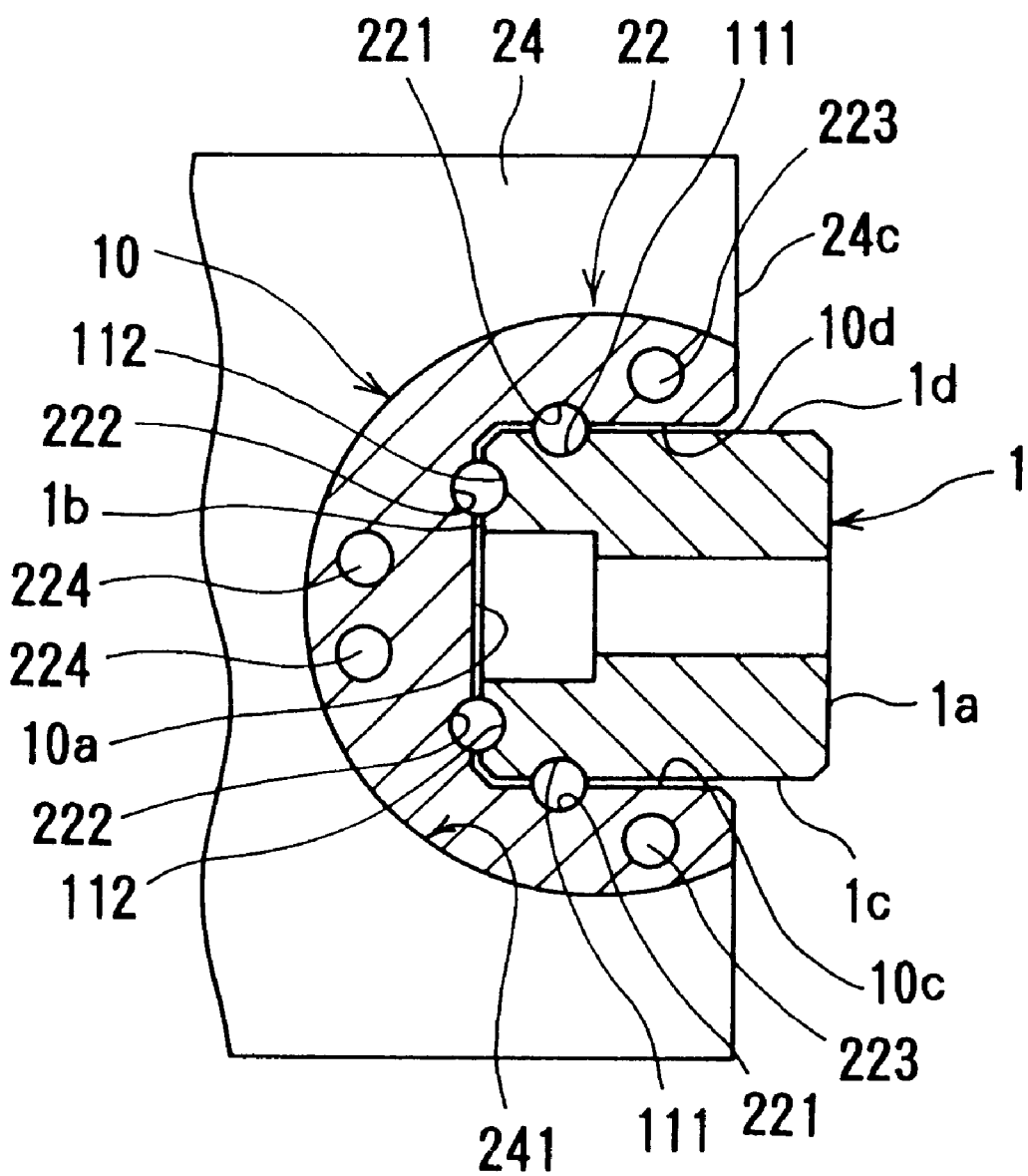
FIG. 7 is an enlarged fragmentary view of a portion of FIG. 5.

FIGS. 5 through 7 show a three-dimensional guiding apparatus according to a second embodiment of the present invention. FIG. 5 is a side elevational view of the three-dimensional guiding apparatus, FIG. 6 is a cross-sectional view taken along line VI—VI of FIG. 5, and FIG. 7 is an enlarged fragmentary view of a portion of FIG. 5. Those parts of the embodiment shown in FIGS. 5 through 7 which operate in the same manner as with those of the embodiment shown in FIGS. 1 through 4 will be described with identical reference characters.

The major arrangement of the second embodiment is identical to the arrangement of the first embodiment. However, a second curved guiding apparatus 22 and an intermediate member 24 according to the second embodiment are different from those of the first embodiment. Specifically, as shown in FIGS. 5 and 6, the curved track rail 1 of the second curved guiding apparatus 22 of the three-dimensional guiding apparatus according to the second embodiment has a substantially rectangular cross-sectional shape and is arcuately curved with a predetermined vertical curvature, as with the first embodiment, but is angularly displaced 90° from the curved track rail 1 according to the first embodiment. The curved track rail 1 of the second curved guiding apparatus 22 has a concave third surface 1c and a convex fourth surface 1d. As shown in FIG. 7, the third and fourth surfaces 1c, 1d of the track rail 1 have respective ball rolling grooves 111 defined therein along the track rail 1. The second surface 1b opposite to the first surface 1a has parallel ball rolling grooves 112 defined therein along an arcuate shape of predetermined curvature.

The bearing block 10 of the second curved guiding apparatus 22 comprises a substantially cylindrical rigid body, and has inner side surfaces 10c, 10d comprising curved surfaces along the third and fourth surfaces 1c, 1d of the track rail 1. The third and fourth surfaces 10c, 10d of the bearing block 10 have ball rolling grooves 221 defined therein in alignment with the ball rolling grooves 111 of the curved track rail 1. The bearing block 10 also has parallel ball rolling grooves 222 defined in an inner lower surface 10a thereof in alignment with the ball rolling grooves 112 along an arcuate shape of predetermined curvature.

The intermediate member 24 has an open cylindrical recess 242 defined in a lower surface 24b thereof and an open cylindrical recess 241 defined in a side surface 24c thereof. Bearing blocks 10 are rotatably fitted respectively in the cylindrical recesses 241, 242. Amoving base 25 is fixedly mounted on the first surface (attachment surface) 1a of the track rail 1, and extends upwardly. The upper surface of the moving base 25 constitutes an installation surface of the building. The parts of other components such as the first curved guiding apparatus 21 are identical to those of the first embodiment.

[3rd Embodiment]

Figure 8:
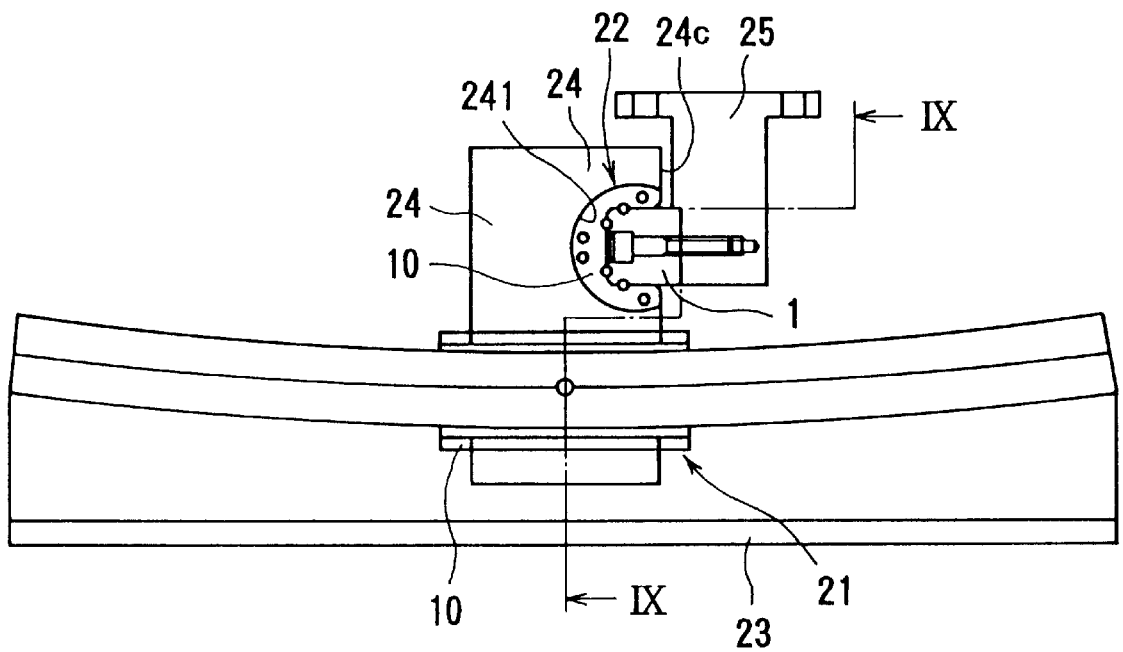
FIG. 8 is a side elevational view of a three-dimensional guiding apparatus according to a third embodiment of the present invention.
Figure 9:
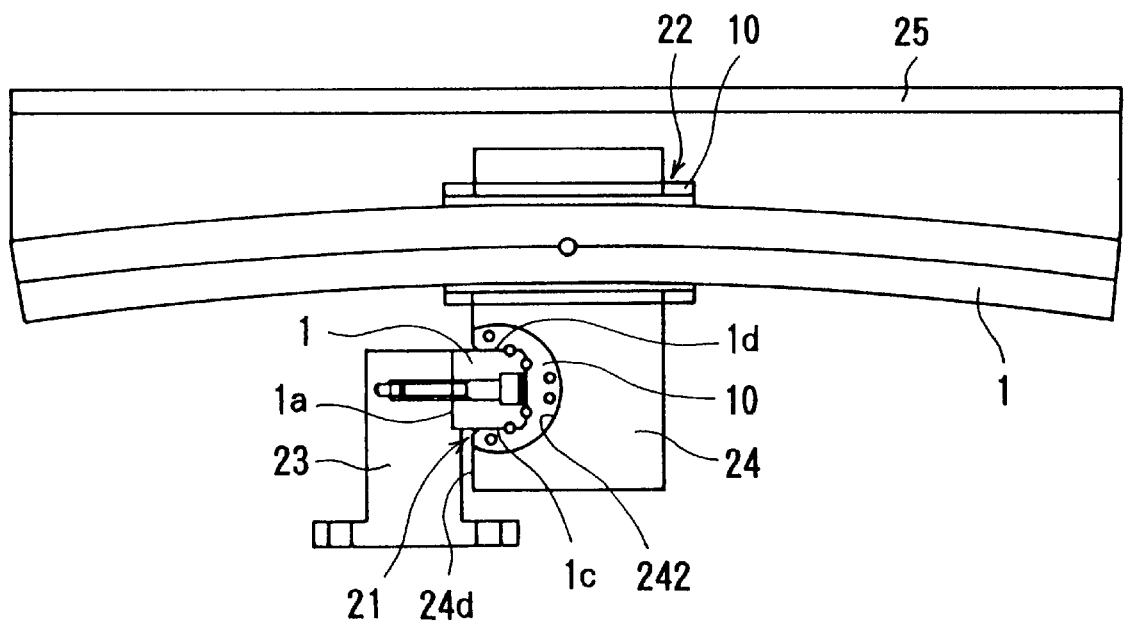
FIG. 9 is a cross-sectional view taken along line IX—IX of FIG. 8.
Figure 10:
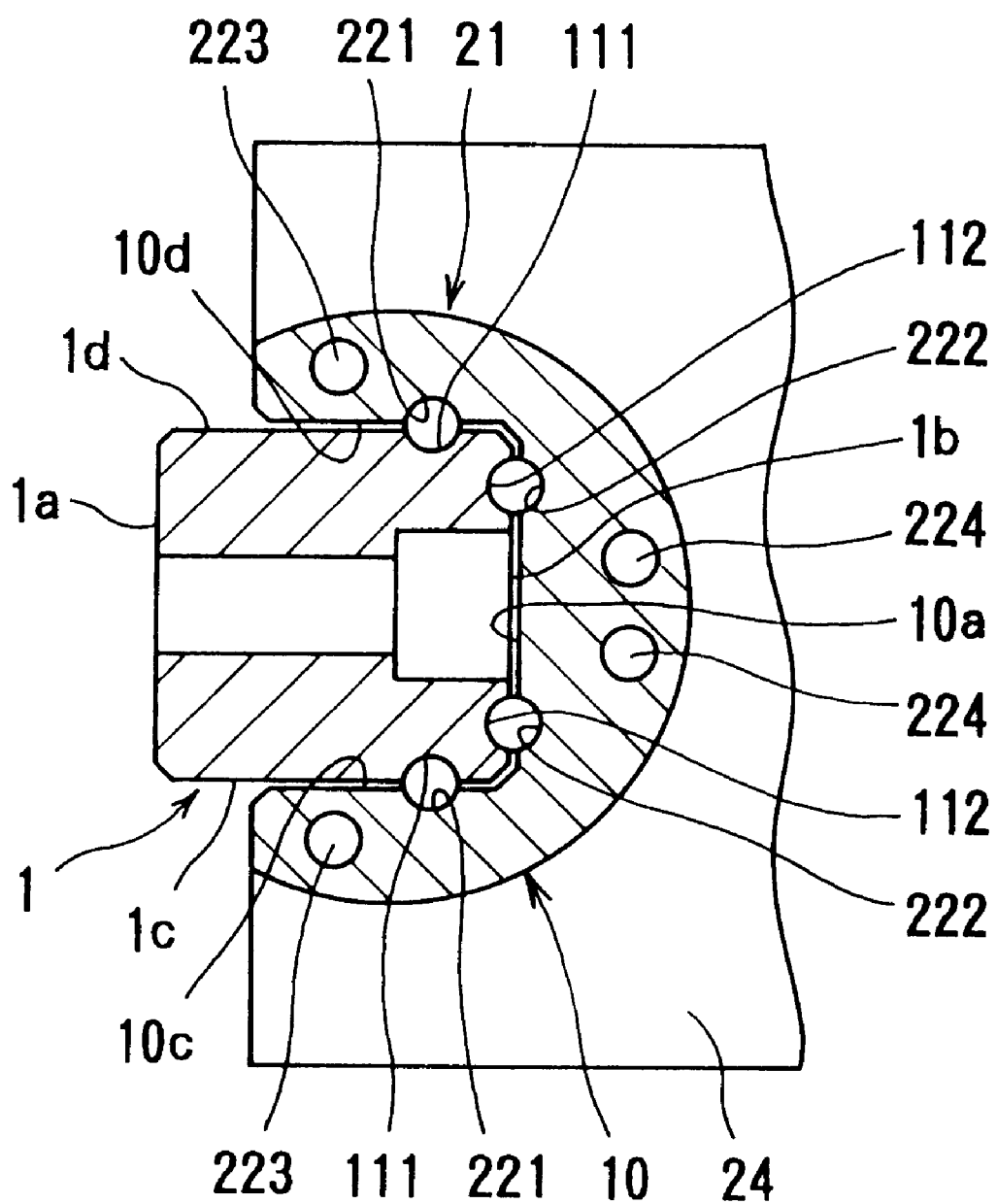
FIG. 10 is an enlarged fragmentary view of a portion of FIG. 9.

FIGS. 8 through 10 show a three-dimensional guiding apparatus according to a third embodiment of the present invention. FIG. 8 is a side elevational view of the three-dimensional guiding apparatus, and FIG. 9 is a cross-sectional view taken along line IX—IX of FIG. 8. Those parts of the embodiment shown in FIGS. 8 through 10 which operate in the same manner as with those of the embodiment shown in FIGS. 1 through 4 will be described with identical reference characters.

The major arrangement of the third embodiment is identical to the arrangement of the second embodiment. However, a first curved guiding apparatus 21 and an intermediate member 24 according to the third embodiment are different from those of the second embodiment. Specifically, as shown in FIGS. 8 and 9, the curved track rail 1 of the first curved guiding apparatus 21 of the three-dimensional guiding apparatus according to the third embodiment has a substantially rectangular cross-sectional shape and is arcuately curved with a predetermined vertical curvature, as with the second embodiment, but is angularly displaced 90° from the curved track rail 1 according to the second embodiment. The curved track rail 1 of the second curved guiding apparatus 22 has a concave third surface 1c and a convex fourth surface 1d. As shown in FIG. 10, the third and fourth surfaces 1c, 1d of the track rail 1 have respective ball rolling grooves 111 defined therein along the track rail 1. The second surface 1b has parallel ball rolling grooves 112 defined therein along an arcuate shape of predetermined curvature.

The bearing block 10 of the first curved guiding apparatus 21 comprises a substantially cylindrical rigid body, and has inner side surfaces 10c, 10d comprising curved surfaces along the third and fourth surfaces 1c, 1d of the track rail 1. The third and fourth surfaces 10c, 10d of the bearing block 10 have ball rolling grooves 221 defined therein in alignment with the ball rolling grooves 111 of the curved track rail 1. The bearing block 10 also has parallel ball rolling grooves 222 defined in an inner lower surface 10a thereof in alignment with the ball rolling grooves 112 along an arcuate shape of predetermined curvature.

The intermediate member 24 has an open cylindrical recess 241 defined in a side surface 24c thereof and an open cylindrical recess 242 defined in another side surface 24d thereof. Bearing blocks 10 are rotatably fitted respectively in the cylindrical recesses 241, 242. A base 23 is fixedly mounted on the first surface (attachment surface) 1a of the track rail 1, and extends downwardly. The parts of other components such as the second curved guiding apparatus 22 are identical to those of the second embodiment. According to the second and third embodiments, the bearing blocks 10 fitted in the sides of the intermediate block 24 are effective in reducing the overall vertical height of the three-dimensional guiding apparatus.

[4th Embodiment]

Figure 11:
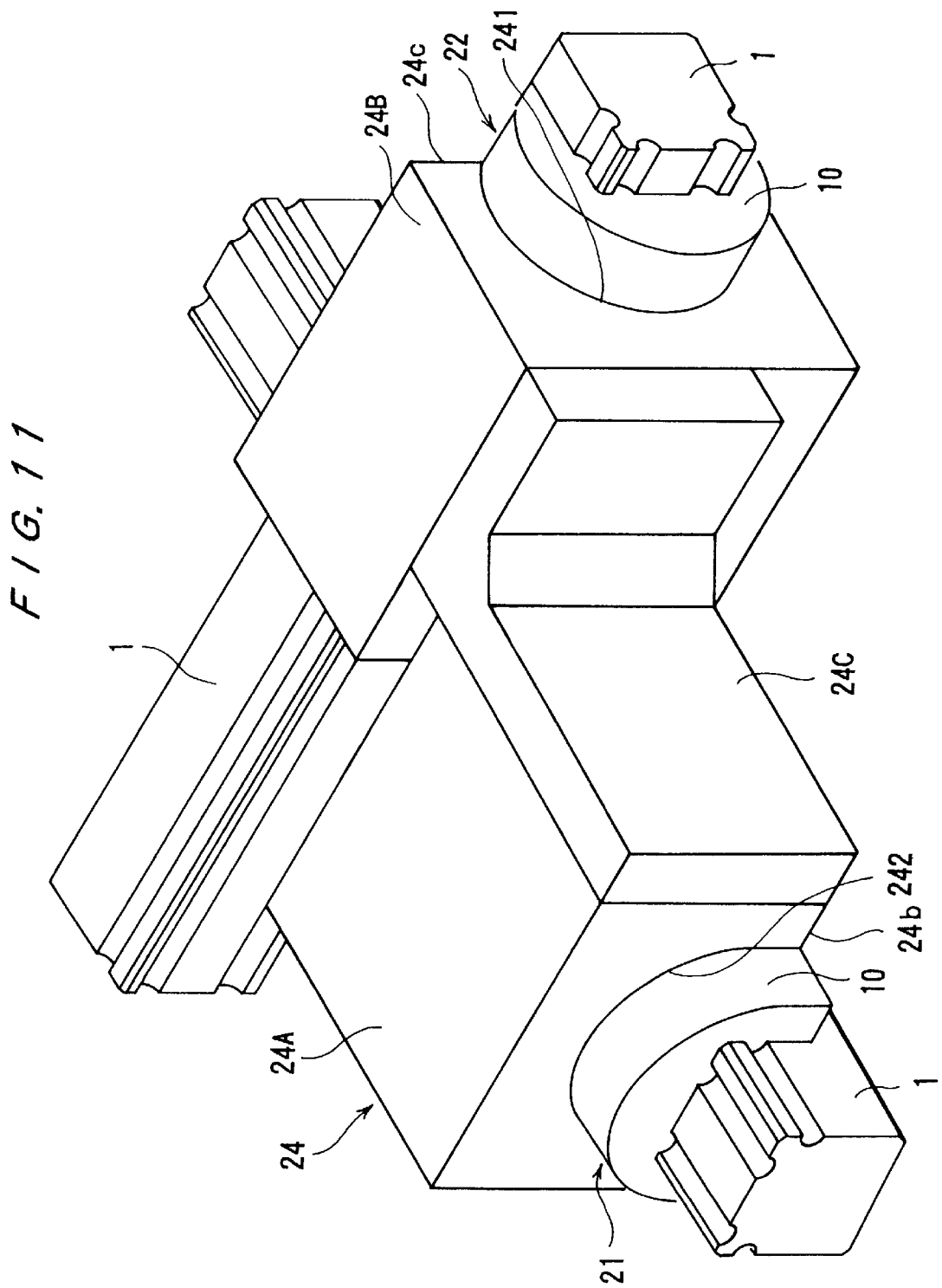
FIG. 11 is a perspective view of a three-dimensional guiding apparatus according to a fourth embodiment of the present invention.
Figure 12:
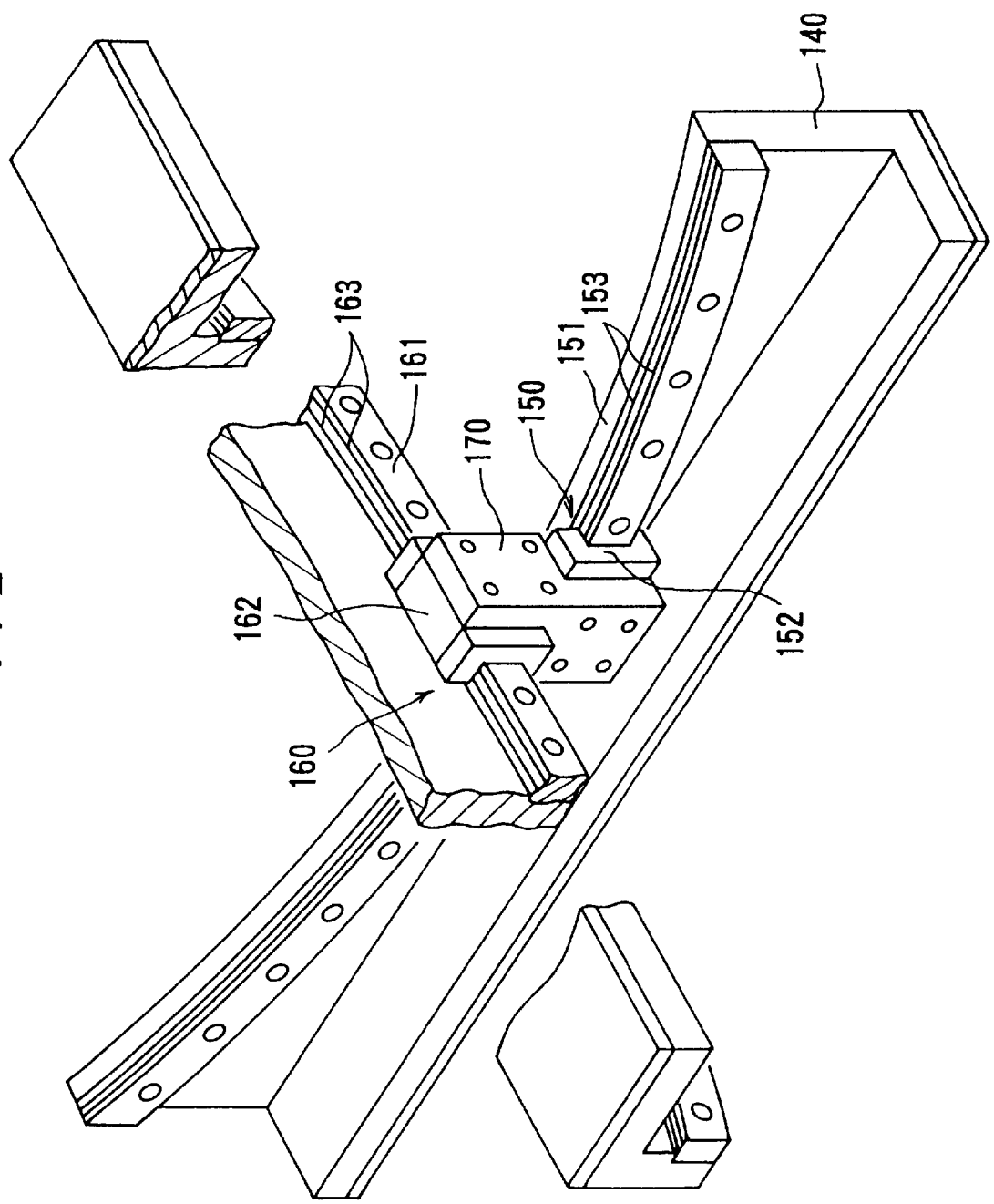
FIG. 12 is a perspective view of an example of the three-dimensional guiding apparatus previously proposed by the applicant of the present invention.
Figure 15A:
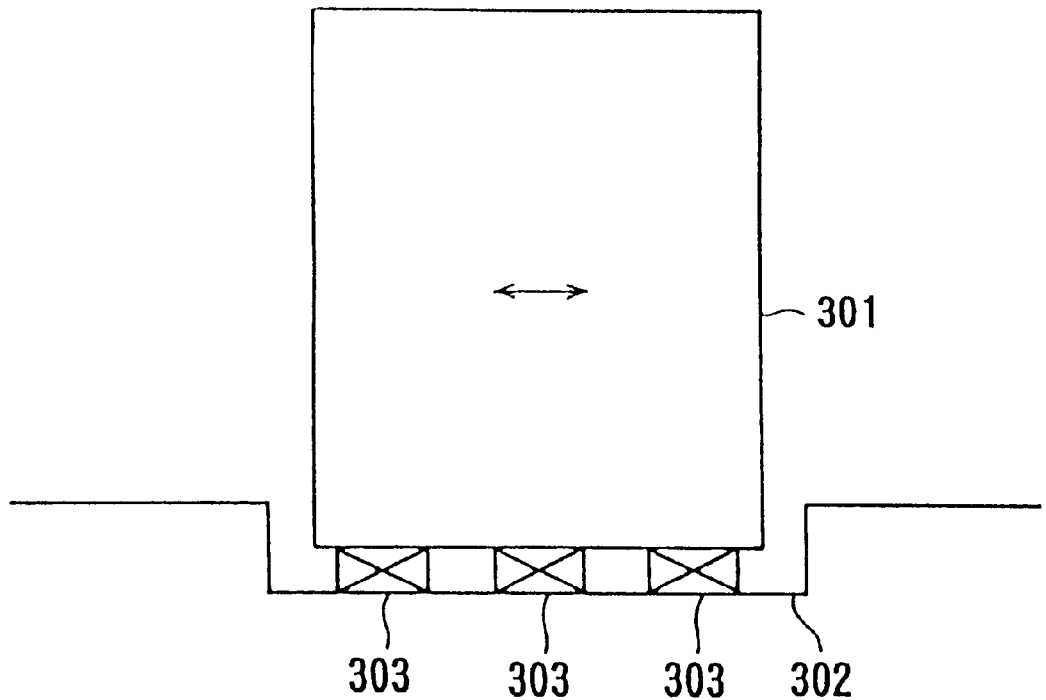
FIGS. 15A and 15B are diagrams illustrative of the relationship between a building and a vibration isolating construction.
Figure 15B:
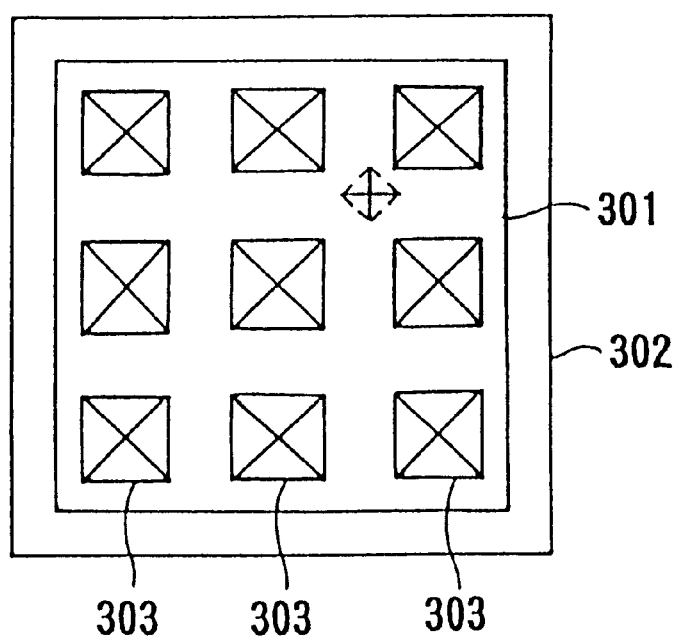

FIG. 11 shows a three-dimensional guiding apparatus according to a fourth embodiment of the present invention. According to the fourth embodiment, the central position of the bearing block 10 of the first curved guiding apparatus 21 and the central position of the bearing block 10 of the second curved guiding apparatus 22 are displaced on a plane to bring the two perpendicular track rails 1 closely together to a position just short of physical interference with each other.

The arrangement of the first and second curved guiding apparatus 21, 22 in the embodiment shown in FIG. 11 is identical to the arrangement of those according to the second embodiment shown in FIGS. 5 through 7. An intermediate member 24 comprises two blocks 24A, 24B, each in the shape of a rectangular parallelepiped, which are joined to each other by an L-shaped connector 24C. The intermediate member 24 has cylindrical recesses 241, 242 defined respectively in a side surface 24c and a lower surface 24b thereof, with the bearing blocks 10 being fitted in the cylindrical recesses 241, 242. The intermediate member 24 as a whole is lower in profile than the intermediate member according to the second embodiment. The intermediate member 24 is not present in an area where the two track rails 1 cross each other. Therefore, two track rails 1 can be brought closely together to a position just short of physical interference with each other.

According to the fourth embodiment, because the intermediate member 24 is shaped to bring the two track rails 1 together to a position just short of physical interference with each other, the overall vertical height of the three-dimensional guiding apparatus is reduced.

In the above embodiments, balls have been described as rolling elements, but rollers may be employed as rolling elements.

According to the present invention, as described above, the intermediate member comprises a rigid body in the form of a block, and the bearing blocks, each in the form of a rigid body, of the first and second curved guiding apparatus, are rotatably fitted in the respective two surfaces of the intermediate member for thereby providing a tilt absorbing capability between the first and second curved guiding apparatus. Therefore, since the tilt absorbing capability is performed and the building is supported by sliding surfaces which have a large contact area and which are provided by the contacting rigid bodies, the three-dimensional guiding apparatus can bear heavy loads and have excellent durability.

According to the present invention, furthermore, a plurality of three-dimensional guiding apparatuses are interposed between the ground and the building. Inasmuch as the two bearing blocks are rotatable with respect to the intermediate member, any misalignments (centering errors) and level errors can be easily absorbed. The intermediate member in the form of a simple low-profile block allows the three-dimensional guiding apparatus to be smaller in vertical height than would be if a universal joint were used as the intermediate member.

Industrial Applicability

The present invention relates to a three-dimensional guiding apparatus and can preferably be used in a vibration isolator for isolating building from vibrations.

What is claimed is:

1. A three-dimensional guiding apparatus having a base, a first curved guiding apparatus mounted on the base and having an arcuate track, a second curved guiding apparatus disposed above the first curved guiding apparatus and having a plane of movement along an arcuate track which crosses the plane of movement of the first curved guiding apparatus, and an intermediate member positioned between the first curved guiding apparatus and the second curved guiding apparatus and interconnecting the first curved guiding apparatus and the second curved guiding apparatus, each of the first and second curved guiding apparatuses comprising:
a track rail vertically curved at a predetermined curvature and having a plurality of rolling element rolling grooves defined in outer surfaces thereof;
a bearing block comprising a substantially cylindrical rigid body and having in inner surfaces thereof a plurality of rolling element rolling grooves in alignment with said rolling element rolling grooves in said track rail and non-loading rolling element rolling passages adjacent to said rolling element rolling grooves;
a pair of lids mounted respectively on front and rear ends of said bearing block and having respective rolling element direction changing passages defined in respective inner surfaces thereof, said rolling element direction changing passages connecting ends of said rolling element rolling grooves and said non-loading rolling element passages and providing an endless rolling element circulation path; and
a plurality of rolling elements disposed to circulate in said endless rolling element circulation path for bearing loads between said rolling element rolling grooves in said track rail and the rolling element rolling grooves in said bearing block;
said intermediate member comprising a rigid body in the form of a block and having open cylindrical recesses defined respectively in two surfaces thereof, said bearing blocks being rotatably fitted in said open cylindrical recesses.

2. A three-dimensional guiding apparatus according to claim 1, wherein said cylindrical recesses are defined respectively in upper and lower surfaces of said intermediate member.

3. A three-dimensional guiding apparatus according to claim 1, wherein said intermediate member has said cylindrical recesses defined respectively in lower and side surfaces thereof.

4. A three-dimensional guiding apparatus according to claim 1, wherein said intermediate member has said cylindrical recesses defined respectively in both side surfaces thereof.

5. A three-dimensional guiding apparatus according to claim 1, wherein said intermediate member has said cylindrical recesses defined in respective positions so that the central position of one of the bearing blocks and the central position of the other bearing block are displaced on a plane to bring the two perpendicular track rails closely together.

6. A three-dimensional guiding apparatus according claim 2, wherein said intermediate member has said cylindrical recesses defined in respective positions so that the central position of one of the bearing blocks and the central position of the other bearing block are displaced on a plane to bring the two perpendicular track rails closely together.

7. A three-dimensional guiding apparatus according claim 3, wherein said intermediate member has said cylindrical recesses defined in respective positions so that the central position of one of the bearing blocks and the central position of the other bearing block are displaced on a plane to bring the two perpendicular track rails closely together.

8. A three-dimensional guiding apparatus according claim 4, wherein said intermediate member has said cylindrical recesses defined in respective positions so that the central position of one of the bearing blocks and the central position of the other bearing block are displaced on a plane to bring the two perpendicular track rails closely together.

* * * * *